(12) United States Patent
Mischler et al.

(10) Patent No.: US 10,428,729 B2
(45) Date of Patent: Oct. 1, 2019

(54) SYSTEMS AND METHOD FOR AN ENGINE BYPASS VALVE

(71) Applicant: General Electric Company, Schenectady, NY (US)

(72) Inventors: James Robert Mischler, Erie, PA (US); Thomas Michael Lavertu, Clifton Park, NY (US); Jared Davis Vaughn, Fairview, PA (US); Alok Kumar, Bangalore (IN); Richard James Scott, North East, PA (US)

(73) Assignee: GE Global Sourcing LLC, Norwalk, CT (US)

( * ) Notice: Subject to any disclaimer, the term of this patent is extended or adjusted under 35 U.S.C. 154(b) by 325 days.

(21) Appl. No.: 15/245,212

(22) Filed: Aug. 24, 2016

(65) Prior Publication Data

US 2018/0058310 A1  Mar. 1, 2018

(51) Int. Cl.
| | |
|---|---|
| *F02B 37/16* | (2006.01) |
| *F02M 26/05* | (2016.01) |
| *F02D 41/00* | (2006.01) |
| *F02M 26/41* | (2016.01) |
| *F02B 37/00* | (2006.01) |
| *F02B 37/013* | (2006.01) |
| *F02D 41/14* | (2006.01) |
| *F02M 26/43* | (2016.01) |
| *F02B 37/12* | (2006.01) |

(52) U.S. Cl.
CPC .......... *F02B 37/168* (2013.01); *F02B 37/004* (2013.01); *F02B 37/013* (2013.01); *F02D 41/0007* (2013.01); *F02D 41/0052* (2013.01); *F02D 41/144* (2013.01); *F02M 26/05* (2016.02); *F02M 26/41* (2016.02); *F02M 26/43* (2016.02); *F02B 2037/125* (2013.01); *F02D 41/1448* (2013.01); *F02D 2200/0406* (2013.01); *Y02T 10/144* (2013.01); *Y02T 10/47* (2013.01)

(58) Field of Classification Search
CPC .... F02B 37/168; F02B 37/004; F02B 37/013; F02B 2037/0125; F02M 26/05; F02M 26/41; F02D 41/0007; F02D 41/0052; F02D 41/144; F02D 41/1448; F02D 2200/0406
USPC ........... 60/605.2, 606, 611, 612, 602, 605.1; 123/562
See application file for complete search history.

(56) References Cited

U.S. PATENT DOCUMENTS

| | | |
|---|---|---|
| 3,102,381 A | 9/1963 | Tryhorn |
| 3,232,044 A | 2/1966 | Gratzmuller |

(Continued)

FOREIGN PATENT DOCUMENTS

| | | |
|---|---|---|
| EP | 0263806 A2 | 4/1988 |
| WO | 2009028003 A1 | 3/2009 |

*Primary Examiner* — Thai Ba Trieu
(74) *Attorney, Agent, or Firm* — McCoy Russell LLP (57) ABSTRACT

Various systems and methods are provided for controlling operation of a turbocharger compressor. In one example, a system includes a turbocharger including a turbine positioned in an exhaust passage and a compressor positioned in an intake passage, an engine bypass passage having an inlet fluidically coupled to an outlet of the compressor and an outlet fluidically coupled to an inlet of the turbine, an engine bypass valve to control flow through the engine bypass passage, and a controller configured to adjust a position of the engine bypass valve to maintain compressor operation within a designated compressor efficiency region.

20 Claims, 4 Drawing Sheets

(56) References Cited

U.S. PATENT DOCUMENTS

| | | | |
|---|---|---|---|
| 3,776,207 A | | 12/1973 | Simko |
| 4,249,382 A | | 2/1981 | Evans et al. |
| 4,373,336 A | | 2/1983 | Horler et al. |
| 6,470,864 B2 | * | 10/2002 | Kim ................ F02M 26/19 60/605.2 |
| 6,601,388 B1 | | 8/2003 | Gladden |
| 6,912,852 B2 | | 7/2005 | Gottemoller et al. |
| 7,254,948 B2 | | 8/2007 | Gustafson et al. |
| 7,533,657 B2 | | 5/2009 | Onodera |
| 7,610,757 B2 | | 11/2009 | Onodera |
| 8,001,780 B2 | | 8/2011 | Onodera |
| 8,985,088 B2 | * | 3/2015 | Blythe ............ F02D 41/0052 60/605.2 |
| 9,279,396 B2 | | 3/2016 | Rollinger et al. |
| 2003/0216856 A1 | * | 11/2003 | Jacobson ............ F02B 37/00 701/114 |
| 2007/0262283 A1 | | 11/2007 | Onodera |
| 2008/0134677 A1 | | 6/2008 | Onodera |
| 2009/0049835 A1 | | 2/2009 | Onodera |
| 2011/0307127 A1 | * | 12/2011 | Swenson ............ F02B 37/16 60/605.2 |
| 2013/0231806 A1 | | 9/2013 | Bailey et al. |
| 2014/0047834 A1 | * | 2/2014 | Polkus ............... F02D 23/00 60/602 |
| 2014/0067236 A1 | * | 3/2014 | Henry ............ F02D 41/0007 60/602 |
| 2015/0047322 A1 | | 2/2015 | Peters et al. |
| 2015/0089940 A1 | * | 4/2015 | Sivasubramaniam .. F02D 23/00 60/602 |

* cited by examiner

SYSTEMS AND METHOD FOR AN ENGINE BYPASS VALVE

BACKGROUND

Technical Field

Embodiments of the subject matter disclosed herein relate to engine systems.

Discussion of Art

Engines may utilize one or more turbochargers to provide increased power. Turbochargers function by compressing intake air in a compressor driven by a turbine operated by exhaust gas flow. During certain conditions, turbochargers may experience surge. Surge occurs when the compressor is no longer able to pump air into the charged air piping (e.g., intake manifold) due to excessive pressure in the charged air piping. When this happens, it causes a transient response where the air flows backwards through the compressor wheel. This causes an unloading of the compressor wheel which results in a speed increase of the turbocharger turbine. Surging can be common during rapid unloading events of the engine. Repeated surging events can cause degradation of the turbocharger, including blade segments breaking from the compressor wheel.

BRIEF DESCRIPTION

In one embodiment, a system includes a turbocharger including a turbine positioned in an exhaust passage and a compressor positioned in an intake passage, an engine bypass passage having an inlet fluidically coupled to an outlet of the compressor and an outlet fluidically coupled to an inlet of the turbine, an engine bypass valve to control flow through the engine bypass passage, and a controller configured to adjust a position of the engine bypass valve to maintain compressor operation within a designated compressor efficiency region.

DETAILED DESCRIPTION

The following description relates to embodiments of systems for an engine bypass valve controlling flow from an outlet of a compressor to an exhaust system. The engine bypass valve may control flow from the outlet of the compressor to an inlet of a turbine coupled to the compressor in one example. In another example, the engine bypass valve may control flow from the outlet of the compressor to a portion of the exhaust downstream of the turbine, such as to the exhaust stack. The engine bypass valve may be opened to direct compressed intake air to the exhaust rather than the engine, thus bypassing the engine. When the engine bypass valve is opened, compressor outlet pressure may decrease and in some examples turbine speed may increase. In doing so, compressor surge may be avoided, cylinder pressure may be decreased, and/or compressor operation may be maintained in a region of designated efficiency, such as peak efficiency.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Figure 1:
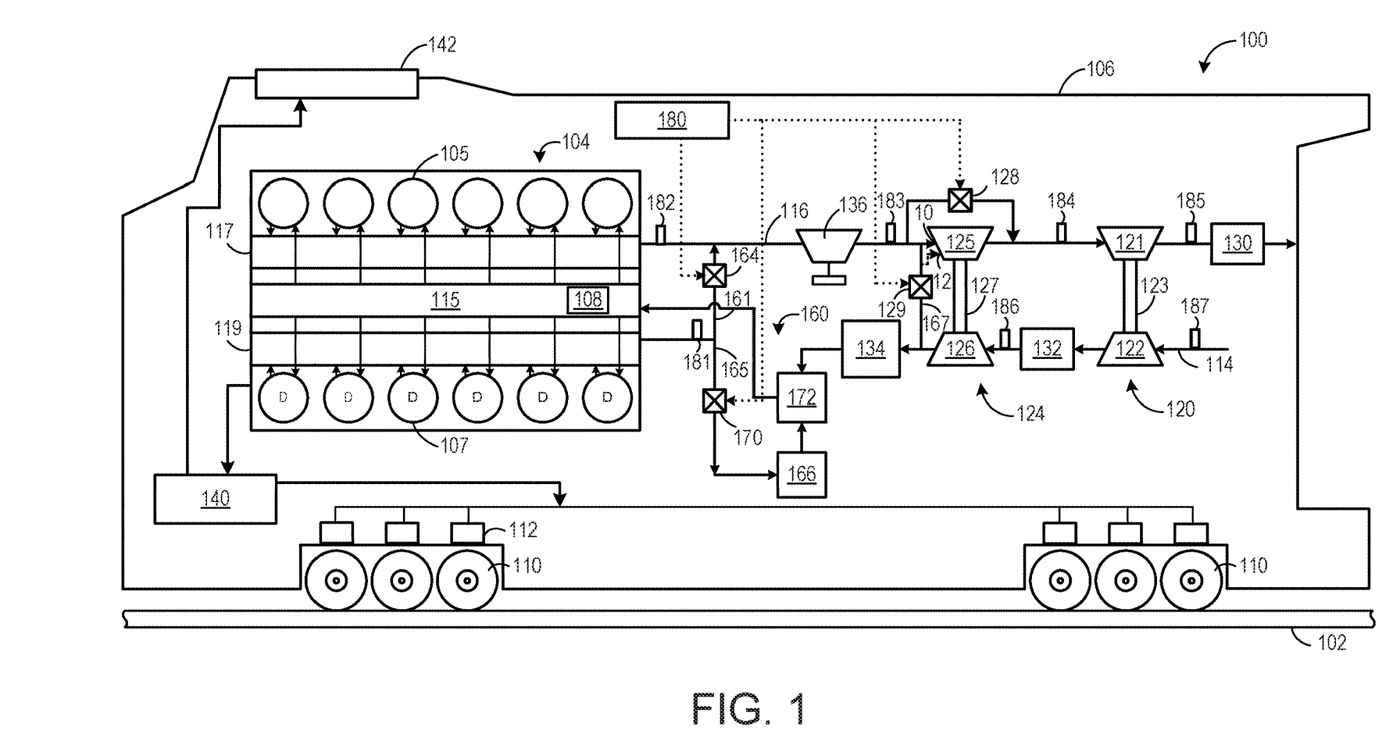
FIG. 1 shows a vehicle system with an engine bypass according to a first embodiment.

Before further discussion of the approach for controlling compressor operation, an example of a platform is disclosed in which an engine may be configured for a vehicle, such as a rail vehicle. For example, FIG. 1 shows a block diagram of an embodiment of a vehicle system 100 (e.g., a locomotive system), herein depicted as a rail vehicle 106, configured to run on a rail 102 via a plurality of wheels 110. As depicted, the rail vehicle 106 includes an engine 104. In other non-limiting embodiments, the engine 104 may be a stationary engine, such as in a power-plant application, or an engine in a marine vessel or off-highway vehicle propulsion system as noted above.

The engine 104 receives intake air for combustion from an intake, such as an intake manifold 115. The intake may be any suitable conduit or conduits through which gases flow to enter the engine. For example, the intake may include the intake manifold 115, the intake passage 114, and the like. The intake passage 114 receives ambient air from an air filter (not shown) that filters air from outside of a vehicle in which the engine 104 may be positioned. Exhaust gas resulting from combustion in the engine 104 is supplied to an exhaust, such as exhaust passage 116. The exhaust may be any suitable conduit through which gases flow from the engine. For example, the exhaust may include an exhaust manifold 117, the exhaust passage 116, and the like. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

In one embodiment, the rail vehicle 106 is a diesel-electric vehicle. As depicted in FIG. 1, the engine 104 is coupled to an electric power generation system, which includes an alternator/generator 140 and electric traction motors 112. For example, the engine 104 is a diesel engine that generates a torque output that is transmitted to the alternator/generator 140 which is mechanically coupled to the engine 104. The alternator/generator 140 produces electrical power that may be stored and applied for subsequent propagation to a variety of downstream electrical components. As an example, the alternator/generator 140 may be electrically coupled to a plurality of traction motors 112 and the alternator/generator 140 may provide electrical power to the plurality of traction motors 112. As depicted, the plurality of traction motors 112 are each connected to one of a plurality of wheels 110 to provide tractive power to propel the rail vehicle 106. One example configuration includes one traction motor per wheel. As depicted herein, six pairs of traction motors correspond to each of six pairs of wheels of the rail vehicle. In another example, alternator/generator 140 may be coupled to one or more resistive grids 142. The resistive grids 142 may be configured to dissipate excess engine torque via heat produced by the grids from electricity generated by alternator/generator 140.

In the embodiment depicted in FIG. 1, the engine 104 is a V-12 engine having twelve cylinders. In other examples, the engine may be a V-6, V-8, V-10, V-16, I-4, I-6, I-8, opposed 4, or another engine type. As depicted, the engine 104 includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. In some examples, the engine may have an equal number of donor and non-donor cylinders. In other examples, the engine may have more donor cylinders than non-donor cylinders. In still further examples, the engine may be comprised entirely of donor cylinders. It should be understood, the engine may have any desired numbers of donor cylinders and non-donor cylinders. Further, in some embodiments, the donor cylinders only supply exhaust gas to the donor cylinder exhaust manifold and not to the non-donor cylinder exhaust manifold. In some embodiments, the non-donor cylinders only supply exhaust gas to the non-donor cylinder exhaust manifold and not to the donor cylinder exhaust manifold.

As depicted in FIG. 1, the non-donor cylinders 105 are coupled to the exhaust passage 116 to route exhaust gas from the engine to atmosphere (after it passes through first and second turbochargers 120 and 124, and in some embodiments, through aftertreatment system 130). The donor cylinders 107, which provide engine exhaust gas recirculation (EGR), are coupled exclusively to an EGR passage 165 of an EGR system 160 which selectively routes exhaust gas from the donor cylinders 107 to the intake passage 114 of the engine 104 or to atmosphere via the exhaust passage 116. By introducing cooled exhaust gas to the engine 104, the amount of available oxygen for combustion is decreased, thereby reducing combustion flame temperatures and reducing the formation of nitrogen oxides (e.g., $NO_x$). Additional details regarding EGR system 160 will be provided below.

As depicted in FIG. 1, the vehicle system 100 further includes a two-stage turbocharger with the first turbocharger 120 and the second turbocharger 124 arranged in series, each of the turbochargers 120 and 124 arranged between the intake passage 114 and the exhaust passage 116. The two-stage turbocharger increases air charge of ambient air drawn into the intake passage 114 in order to provide greater charge density during combustion to increase power output and/or engine-operating efficiency. The first turbocharger 120 operates at a relatively lower pressure, and includes a first turbine 121 which drives a first compressor 122. The first turbine 121 and the first compressor 122 are mechanically coupled via a first shaft 123. The first turbocharger may be referred to the "low-pressure stage" of the turbocharger. The second turbocharger 124 operates at a relatively higher pressure, and includes a second turbine 125 which drives a second compressor 126. The second turbocharger may be referred to the "high-pressure stage" of the turbocharger. The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one example, three turbochargers are used in series. In another example, only two turbochargers are used in series.

In the embodiment shown in FIG. 1, the second turbocharger 124 is provided with a turbine bypass valve 128 which allows exhaust gas to bypass the second turbocharger 124. The turbine bypass valve 128 may be opened, for example, to divert the exhaust gas flow away from the second turbine 125. In this manner, the rotating speed of the compressor 126, and thus the boost provided by the turbochargers 120, 124 to the engine 104 may be regulated during steady state conditions. Additionally, the first turbocharger 120 may also be provided with a turbine bypass valve. In other embodiments, only the first turbocharger 120 may be provided with a turbine bypass valve, or only the second turbocharger 124 may be provided with a turbine bypass valve.

While not shown in FIG. 1, in some examples two low-pressure turbochargers may be present. As such, two charge air coolers (e.g., intercoolers) may be present, one positioned downstream of each low-pressure compressor. In one example, the low-pressure turbochargers may be present in parallel, such that charge air that flows through each low-pressure compressor is combined and directed to the high-pressure compressor.

While in the example vehicle system described herein with respect to FIG. 1 includes a two-stage turbocharger, it is to be understood that other turbocharger arrangements are possible. In one example, only a single turbocharger may be present. In such cases, only one charge air cooler may be utilized, rather than the two coolers depicted in FIG. 1 (e.g., intercooler 132 and aftercooler 134). In some examples, a turbo-compounding system may be used, where a power turbine 136 positioned in the exhaust passage is mechanically coupled to the engine or to the alternator. Herein, energy extracted from the exhaust gas by the turbine is used to rotate the crankshaft to provide further energy for propelling the vehicle system, or to rotate the alternator to generate electricity for storage in a battery. The power turbine 136 may be positioned upstream of turbine 125 and may be controlled by the control unit to provide a desired expansion ratio across the power turbine. To adjust the power turbine, exhaust flow through the power turbine may be adjusted, for example via adjustment of a wastegate/turbine bypass. Additionally or alternatively, the power turbine may be adjusted by adjusting the load placed on the power turbine by the engine or alternator, via a clutch or other mechanism.

The vehicle system 100 includes an engine bypass valve 129 positioned in an engine bypass passage 167 coupled across the high-pressure turbocharger. The engine bypass passage 167 has an inlet coupled to the outlet of the high-pressure compressor (compressor 126) and an outlet coupled to the inlet of the high-pressure turbine 125. Compressed intake air that flows through the engine bypass passage eventually exits to atmosphere, without participating in combustion in the engine cylinders.

The engine bypass valve 129 is adjustable via a suitable actuator, such as an electric actuator, in order to redirect compressed intake air to the high-pressure turbine. For example, the control unit may command the engine bypass valve to open in order to increase flow through the high-pressure turbine, thus avoiding surge of the high-pressure compressor, maintaining operation within a region of designated compressor efficiency, and/or lowering peak cylinder pressure. In some examples, the outlet of the engine bypass passage may couple with the exhaust passage upstream of the turbine, such that the compressed intake air from the engine bypass passage flows with the engine exhaust into a single inlet 10 of the turbine. However, in other examples, the turbine may include two inlets, a first inlet 12 configured to admit only the compressed intake air from the engine bypass passage and a second inlet configured to admit only exhaust gas from the engine (e.g., inlet 10).

The vehicle system 100 optionally includes an exhaust treatment system 130 coupled in the exhaust passage in order to reduce regulated emissions. As depicted in FIG. 1, the exhaust gas treatment system 130 is disposed downstream of the turbine 121 of the first (low pressure) turbocharger 120. In other embodiments, an exhaust gas treatment system may be additionally or alternatively disposed upstream of the first turbocharger 120. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof. However, in some examples the exhaust aftertreatment system 130 may be dispensed with and the exhaust may flow from the exhaust passage to atmosphere without flowing through an aftertreatment device.

Additionally, in some embodiments, the EGR system 160 may include an EGR bypass passage 161 that is coupled to EGR passage 165 and is configured to divert exhaust from the donor cylinders back to the exhaust passage. The EGR bypass passage 161 may be controlled via a first valve 164. The first valve 164 may be configured with a plurality of restriction points such that a variable amount of exhaust is routed to the exhaust, in order to provide a variable amount of EGR to the intake.

The flow of EGR to the intake system via EGR passage 165 may be controlled by a second valve 170. For example, when second valve 170 is open, exhaust may be routed from the donor cylinders to one or more EGR coolers and/or additional elements prior to being routed to the intake passage 114. The first valve 164 and second valve 170 may be on/off valves controlled by the control unit 180 (for turning the flow of EGR on or off), or they may control a variable amount of EGR, for example. In some examples, the first valve 164 may be actuated such that an EGR amount is reduced (exhaust gas flows from the EGR passage 165 to the exhaust passage 116). In other examples, the first valve 164 may be actuated such that the EGR amount is increased (e.g., exhaust gas flows from the donor cylinder manifold to the EGR passage 165). In some embodiments, the EGR system may include a plurality of EGR valves or other flow control elements to control the amount of EGR.

In such a configuration, the first valve 164 is operable to route exhaust from the donor cylinders to the exhaust passage 116 of the engine 104 and the second valve 170 is operable to route exhaust from the donor cylinders to the intake passage 114 of the engine 104. As such, the first valve 164 may be referred to as an EGR bypass valve, while the second valve 170 may be referred to as an EGR metering valve. EGR that flows in EGR passage 165 only flows from the donor cylinders and does not flow from the non-donor cylinders; all exhaust from the non-donor cylinders flows to atmosphere via exhaust passage 116. In the embodiment shown in FIG. 1, the first valve 164 and the second valve 170 may be engine oil, or hydraulically, actuated valves, for example, with a shuttle valve (not shown) to modulate the engine oil. In some examples, the valves may be actuated such that one of the first and second valves 164 and 170 is normally open and the other is normally closed. In other examples, the first and second valves 164 and 170 may be pneumatic valves, electric valves, or another suitable valve.

Exhaust gas flowing from the donor cylinders 107 to the intake passage 114 passes through one or more a heat exchangers such as an EGR cooler to reduce a temperature of (e.g., cool) the exhaust gas before the exhaust gas returns to the intake passage. In some examples, one or more charge air coolers 132 and 134 disposed in the intake passage 114 (e.g., upstream of where the recirculated exhaust gas enters) may be adjusted to further increase cooling of the charge air such that a mixture temperature of charge air and exhaust gas is maintained at a desired temperature. In other examples, the EGR system 160 may include one or more EGR cooler bypasses to bypass EGR cooler 166. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler may be directed to the exhaust passage 116 rather than the intake passage 114.

As shown in FIG. 1, the vehicle system 100 further includes an EGR mixer 172 which mixes the recirculated exhaust gas with charge air such that the exhaust gas may be evenly distributed within the charge air and exhaust gas mixture. In the embodiment depicted in FIG. 1, the EGR system 160 is a high-pressure EGR system which routes exhaust gas from a location upstream of turbochargers 120 and 124 in the exhaust passage 116 to a location downstream of turbochargers 120 and 124 in the intake passage 114. In other embodiments, the vehicle system 100 may additionally or alternatively include a low-pressure EGR system which routes exhaust gas from downstream of the turbochargers 120 and 124 in the exhaust passage 116 to a location upstream of the turbochargers 120 and 124 in the intake passage 114.

The vehicle system 100 further includes the control unit 180, which is provided and configured to control various components related to the vehicle system 100. In one example, the control unit 180 includes a computer control system. The control unit 180 further includes non-transitory, computer readable storage media (not shown) including code for enabling on-board monitoring and control of engine operation. The control unit 180, while overseeing control and management of the vehicle system 100, may be configured to receive signals from a variety of engine sensors, as further elaborated herein, in order to determine operating parameters and operating conditions, and correspondingly adjust various engine actuators to control operation of the vehicle system 100. For example, the control unit 180 may receive signals from various engine sensors including sensor 181 arranged in EGR passage 165, sensor 182 arranged in the exhaust passage 116, sensor 183 arranged in the inlet of the high-pressure turbine, sensor 184 arranged in the inlet of the low-pressure turbine, sensor 185 arranged in the outlet of the low-pressure turbine, sensor 186 arranged in the inlet of the high-pressure compressor, and sensor 187 arranged in the inlet of the low-pressure compressor. The sensors 181, 182, 183, 184, 185, 186, and 187 may detect temperature and/or pressure. Sensor 108 positioned in the intake may detect intake oxygen concentration or other suitable parameter. Additional sensors may include, but are not limited to, engine speed, engine load, boost pressure, ambient pressure, engine temperature, coolant system temperature, etc. Correspondingly, the control unit 180 may control the vehicle system 100 by sending commands to various components such as traction motors, alternator, cylinder valves, throttle, heat exchangers, wastegates or other valves or flow control elements, EGR valves 164 and/or 170, turbine bypass valve 128, engine bypass valve 129, etc.

Figure 2:
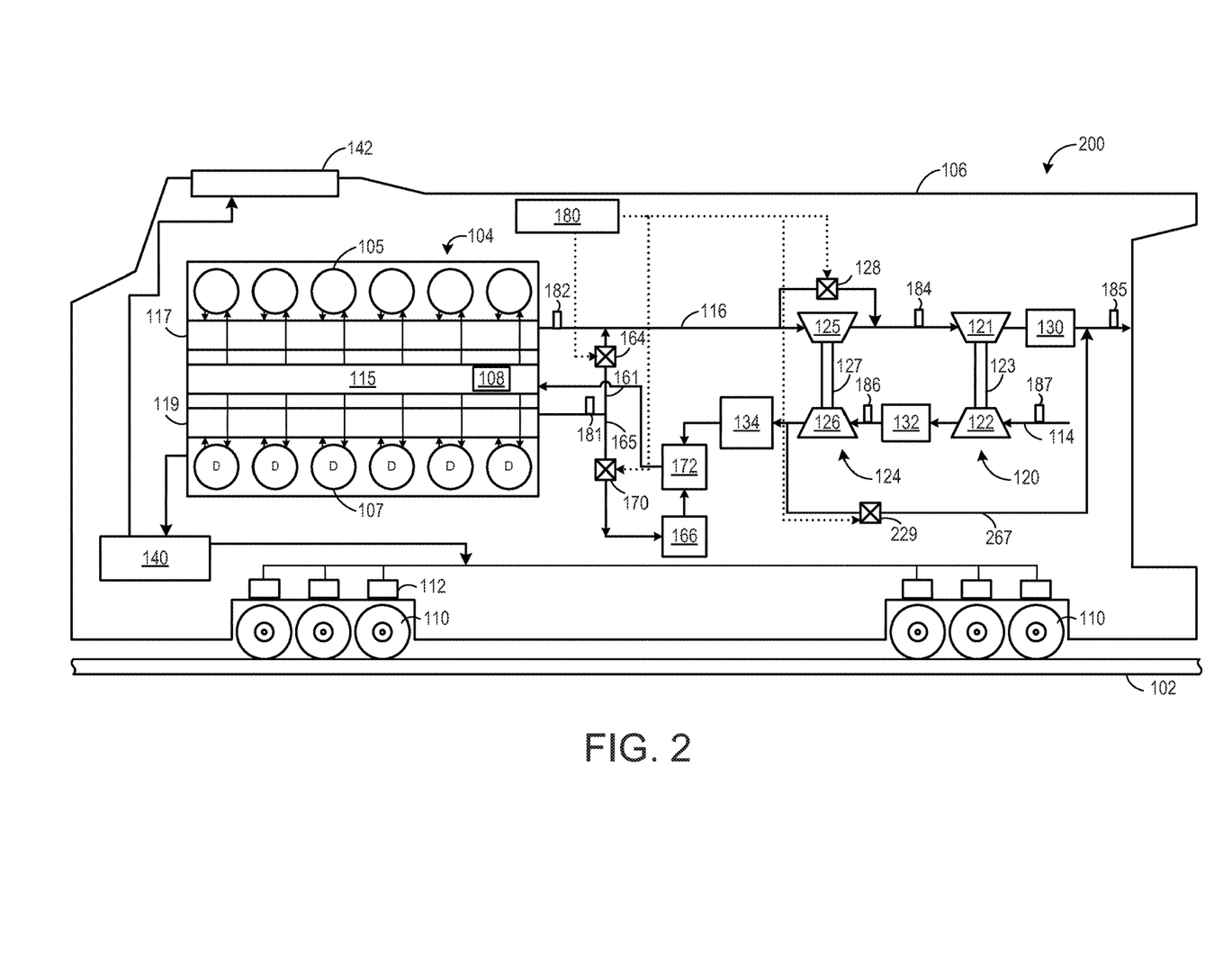
FIG. 2 shows a vehicle system with an engine bypass according to a second embodiment.

Turning to FIG. 2, a second embodiment of a vehicle system 200 is illustrated. Vehicle system 200 includes many similar components to vehicle system 100, and similar components are given like numbers and additional description is not provided. Vehicle system 200 includes a compressor bleed valve 229 rather than an engine bypass valve. Compressor bleed valve 229 is positioned in a bleed passage 267 that couples the outlet of the high-pressure compressor to the exhaust downstream of the turbines, such as at a muffler or the exhaust stack. Compressor bleed valve 229 may be adjusted (e.g., opened) to prevent surge. Thus, the compressor bleed valve 229 may be adjusted to overcome transient surge during wheel slip or sudden notch down operation (e.g., sudden part load condition of engine), to reduce the turbocharger speed if it exceeds the limiting speed during operation, and/or reduce the stack temperature.

Figure 3:
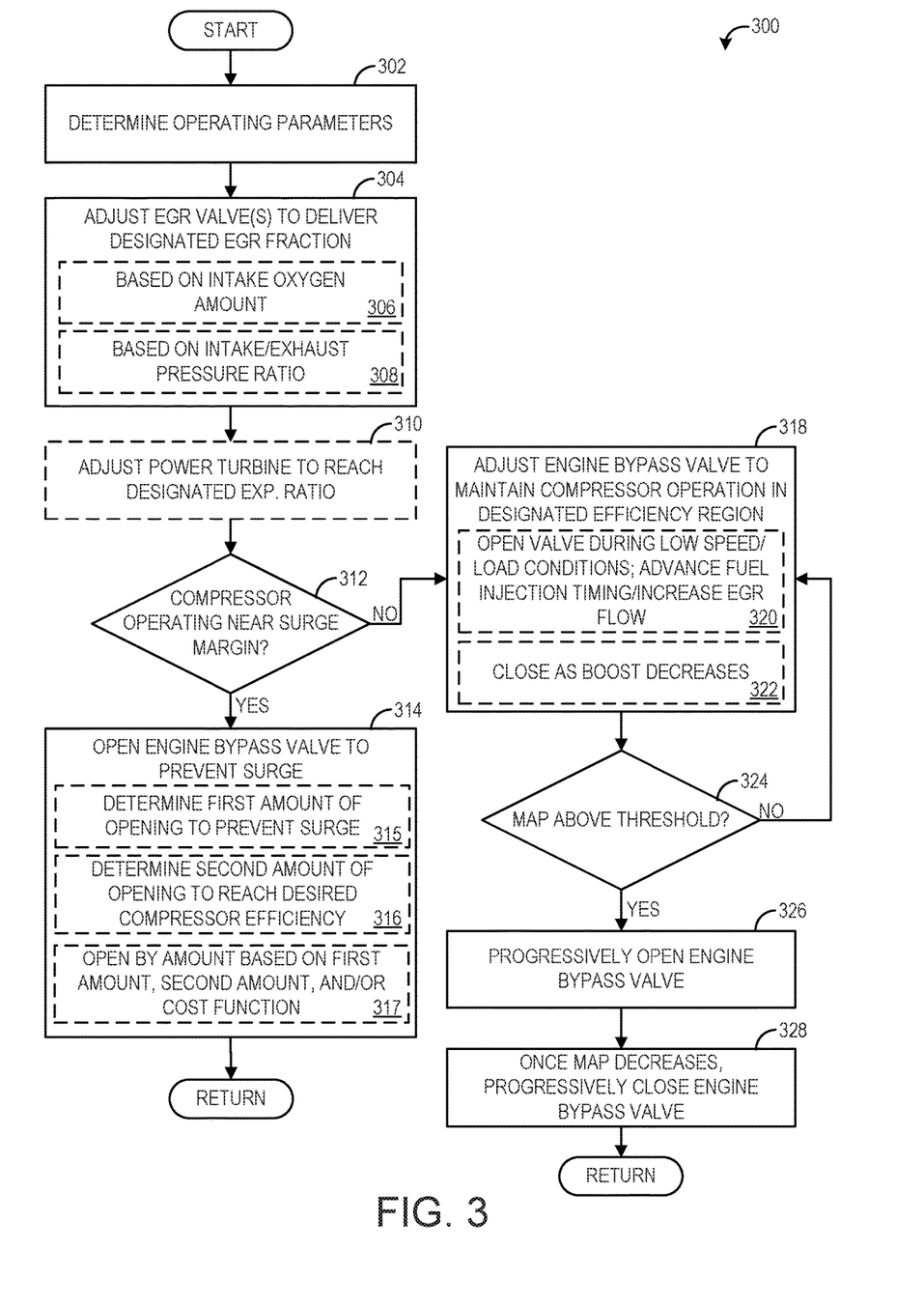
FIG. 3 is a flow chart illustrating an embodiment of a method for controlling an engine.

FIG. 3 is a flow chart illustrating a method 300 for controlling an engine system, such as the engine system of FIG. 1. Method 300 may be carried out by a control unit, such as control unit 180, according to non-transitory instructions stored in memory of the control unit. Method 300 may adjust an engine bypass valve (e.g., valve 129) coupling an outlet of a compressor (e.g., compressor 126) to an inlet of a turbine (e.g., turbine 125) of a turbocharger in order to prevent compressor surge, maintain compressor operation in a designated region, and/or lower peak cylinder pressure.

At 302, method 300 includes determining operating parameters. The determined operating parameters may include engine speed, engine load, engine temperature, exhaust and intake pressures at various locations, and other parameters. At 304, method 300 includes adjusting one or more EGR valves to deliver a designated EGR fraction to an intake of an engine. The one or more EGR valves may include an EGR bypass valve and/or EGR metering valve, such as first valve 164 and second valve 170 of FIG. 1. The EGR valve(s) may be adjusted to provide an EGR amount (e.g., intake fraction, flow rate, or other suitable amount) based on sensed intake oxygen fraction (from sensor 108, for example) and a target intake oxygen concentration, for example, as indicated at 306. In other examples, the EGR valve(s) may be adjusted based on engine speed, engine load, notch throttle position, or other parameters. Additionally, the EGR valve(s) may be adjusted to provide a desired intake/exhaust pressure ratio to allow EGR to flow to the intake, as indicated at 308. For example, the EGR bypass valve may be adjusted to increase the pressure in the EGR passage above intake pressure.

At 310, method 300 optionally includes adjusting a power turbine to reach a designated expansion ratio across the power turbine. The power turbine may be positioned in an exhaust passage upstream of the turbocharger turbine. The designated expansion ratio across the power turbine may be based on desired EGR flow and fuel efficiency. For example, the expansion ratio may be selected to achieve an exhaust pressure (upstream of the power turbine) to allow EGR to flow to the intake (e.g., such that exhaust pressure is greater than the intake pressure). The expansion ratio may be further selected to achieve increased fuel efficiency. In this way, the power turbine may be adjusted (e.g., by adjusting a wastegate or bypass valve position of the power turbine or by adjusting a load placed on the power turbine) to drive the designated EGR flow while also achieving increased fuel efficiency.

Figure 4:
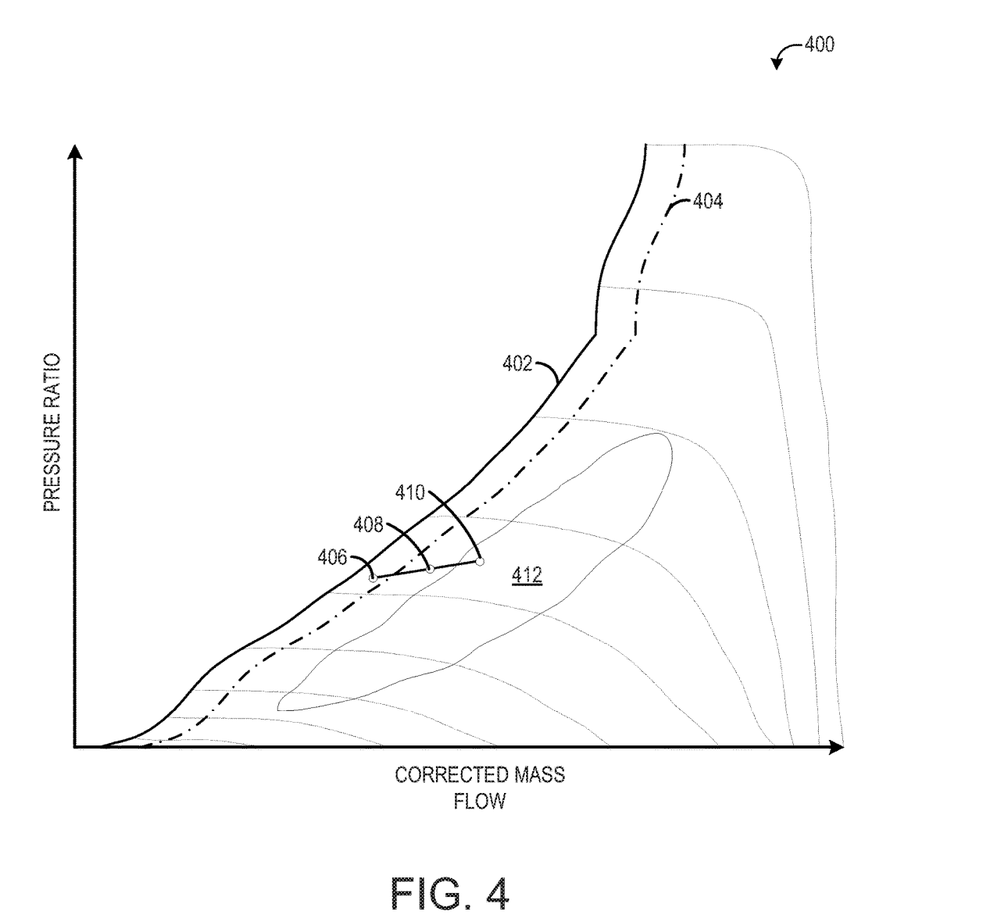
FIG. 4 is an example compressor operating map.

At 312, method 300 includes determining if the compressor is operating near a surge margin. The surge margin may include line on a compressor operating map which defines a region of compressor operation (e.g., compressor mass flow and compressor pressure ratio) in which surge may occur. Compressor surge includes pressure downstream of the compressor being relatively high and/or mass flow through the compressor being relatively low, such that the compressor is no longer able to pump air into the intake manifold, and thus the compressed air may flow backwards through the compressor. FIG. 4 shows an example compressor operating map 400 including compressor mass flow (which may be corrected for temperature) plotted along the horizontal, x-axis and pressure ratio plotted along the vertical, y-axis. A surge margin 402 is illustrated. When the compressor operates with pressure ratio and mass flow operating points to the right of the surge margin, surge is unlikely to occur. However, surge may occur at pressure ratio/mass flow operating points to the left of the surge margin.

As used herein, operating near a surge margin may include compressor operation within a given range of the surge margin. As shown in FIG. 4, operation near the surge margin 402 may include the operating points between line 404 and surge margin 402, such as operating point 406. When the compressor is operating near the surge margin, changes in engine operation may push the compressor into the surge region left of the surge margin. Thus, it may be desirable to maintain compressor operation away from the surge margin to prevent surge.

Returning to FIG. 3, if it is determined that the compressor is operating near the surge margin, for example if the compressor is at a pressure ratio and mass flow within a given range of the surge margin, method 300 proceeds to 314 to open the engine bypass valve to prevent surge. As explained previously, the engine bypass valve couples the compressor outlet to the turbine inlet. When the engine bypass valve is opened, compressed air from the compressor flows into the turbine, thus increasing turbine speed and hence increasing compressor mass flow, which may push compressor operation away from the surge margin. Additionally, particularly during low engine load conditions, opening of the engine bypass valve may increase boost pressure.

While the engine bypass valve may be opened to prevent surge, the opening of the engine bypass valve may affect other operating parameters, such as compressor efficiency, boost pressure, and cylinder pressure. Thus, at least during certain conditions, the amount that the engine bypass valve is opened during surge mitigation may be further based on desired compressor efficiency, boost pressure, future surge event mitigation, effect on downstream components such as the low-pressure turbocharger, and other factors.

Accordingly, opening the engine bypass valve may include determining a first amount of opening to prevent surge, as indicated at 315. For example, with reference to FIG. 4, the compressor may be operating at operating point 406, which is near the surge margin. To prevent surge, the engine bypass valve may be opened by a first amount that pushes the compressor to an operating point away from the surge margin, such as to operating point 408.

In some examples, the engine bypass valve may be opened by an amount more than needed to prevent surge, in order to push the compressor into a designated compressor efficiency region. Thus, as indicated at 316, opening the engine bypass valve may include determining a second amount of opening to reach a desired compressor efficiency. For example, as shown in FIG. 4, a region of peak compressor efficiency 412 is plotted on map 400. Operation within this region may be desired in order to maximize the amount of energy extracted from the exhaust gas and thus increase engine power and/or fuel efficiency. If the compressor is operating at operating point 406, which is near the surge margin, the engine bypass valve may be opened by the first amount to push the compressor to an operating point away from the surge margin, such as operating point 408, as described above. While such an adjustment may adequately prevent a surge event, the compressor may not be operating within the region of peak compressor efficiency 412. Thus, the engine bypass valve may be opened by the second amount, which is more than needed to prevent the surge event, to push the compressor into the region of peak efficiency, such as to operating point 410.

Thus, in some examples the engine bypass valve may be opened by an amount more than needed to prevent a surge event in order to push the compressor to a region of greater efficiency. As used herein, "the region of greater efficiency" may be a region of greater efficiency than an efficiency/region of the compressor prior to the engine bypass valve being opened by the amount more than needed to prevent the surge event, and in some examples may be defined as a region on a compressor map. The region of greater efficiency may be adjacent to a region of lesser efficiency on the compressor map, such that opening of the compressor bypass valve by the amount more than needed pushes compressor operation from the region of lesser efficiency to the region of greater efficiency.

The amount that the engine bypass valve is actually opened may be the first amount, the second amount, or a third amount (that may be between the first and second amount or otherwise based on the first and second amount), and may be determined according to a cost function that balances the effects of opening the engine bypass valve by the first amount and by the second amount. For example, in the engine configuration of FIG. 1, the engine bypass valve is configured to direct flow from the outlet of the high-pressure compressor to the inlet of the high-pressure turbine, but the position of the engine bypass valve may affect operation of the low-pressure turbocharger as well. Thus, the cost function may include the effect the first amount of opening and second amount of opening each have on the operation of the low-pressure turbocharger, such as if the respective amounts of opening will push the low-pressure turbocharger to surge, move the low-pressure turbocharger out of or into a region of desired efficiency, etc.

The cost function may also include a determination of how the first amount of opening and second amount of opening affect boost pressure. For example, the more the engine bypass valve is opened, the more compressed intake air is directed away from the engine. While the redirected compressed intake air is used to increase turbine speed, this effect may be limited and eventually boost pressure may begin to decrease as the engine bypass valve is opened.

The cost function may also include a determination of how the first amount of opening and second amount of opening each affect cylinder pressure. For example, depending on operating conditions, such as current intake manifold pressure, it may be desirable to decrease cylinder pressure or it may be desirable to increase cylinder pressure. The cost function may factor other parameters into the decision of how much to open the engine bypass valve, such as desired component temperatures (e.g., engine temperature, exhaust system temperature), target intake oxygen fraction, designated power turbine expansion ratio, and other parameters.

The selection of the engine bypass valve position/amount of opening of the engine bypass valve according to the cost function may include one or more look-up tables that index compressor conditions (mass flow and pressure ratio), engine parameters (speed and load), boost pressure, and/or other factors to engine bypass valve position. In another example, a base engine bypass valve position may be stored in a look-up table as a function of engine speed and load, for example, and the cost function may include one or more adjustments to the base position as a function of compressor conditions, boost pressure, and/or other parameters. The control unit may determine the adjusted engine bypass valve position and send a signal to an actuator of the engine bypass valve to move the engine bypass valve to the adjusted position.

Thus, a first engine bypass valve position may be determined that mitigates surge and a second engine bypass valve position may be determined that moves compressor operation into a desired region of operation. The engine bypass valve may be adjusted to be in the first position or the second position dependent on whether the engine bypass valve being in the second position adversely effects other operating parameters, such as boost pressure and operation of the low-pressure turbocharger. Further, in some examples, the cost function may determine a third engine bypass valve position that balances the benefits of moving the compressor operation towards the desired region of operation while minimizing adverse effects of operation in the desired region. For example, the third position may include an amount of opening between the first amount and second amount, such that surge is mitigated, the compressor operates in a higher region of efficiency (while not necessarily in the region of peak efficiency), and boost pressure remains within range of desired boost pressure. Method 300 then returns.

If it is determined at 312 that the compressor is not operating near the surge margin, method 300 proceeds to 318 to adjust the engine bypass valve to maintain compressor operation in the designated efficiency region. This may include opening the engine bypass valve at low engine speed/load conditions, as indicated at 320, and closing the engine bypass valve as boost pressure starts decreasing, as indicated at 322. For example, as explained above, the engine bypass valve may be opened to increase turbine speed and push the compressor the region of peak efficiency. However, as the engine bypass valve is opened even more, boost pressure may begin to decrease, owing to the reduction of the intake air being directed to the engine. Thus, the adjustment of the engine bypass valve may include a balance between increasing turbine speed to increase compressor efficiency while still maintaining a designated amount of intake air to the engine. Further, when the engine bypass is opened, fuel injection timing may be advanced and EGR flow may be increased, thus increasing fuel efficiency.

At 324, method 300 includes determining if intake manifold pressure (MAP) is above a threshold pressure. Above the threshold pressure, cylinder pressure may be so high (e.g., above a peak cylinder pressure) that cylinder degradation may occur. To prevent cylinder degradation, the engine bypass valve may be opened to direct the compressed intake air to the exhaust, thus lowering MAP.

Accordingly, if the MAP is not above the threshold, method 300 returns to 318 to continue to adjust the engine bypass valve to maintain compressor operation in the designated efficiency region. If MAP is above the threshold pressure, method 300 proceeds to 326 to progressively open the engine bypass valve. Progressively opening the engine bypass valve may include opening the engine bypass valve by a predetermined amount (e.g., one degree) and assessing MAP. If MAP is still above the threshold pressure, the valve may be opened by another predetermined amount and MAP assessed again. This may be repeated until MAP drops below the threshold. At 328, method 300 progressively closes the engine bypass valve once MAP has decreased below the threshold pressure. In this way, operation at high MAP and hence high cylinder pressure may be avoided, without having to derate the engine. Method 300 then returns.

Thus, method 300 adjusts the engine bypass valve to prevent compressor surge, maintain operation in a region of designated (e.g., peak) compressor efficiency and desired boost pressure, and/or lower cylinder pressure. The opening of the engine bypass valve and subsequent flow of compressed intake air to the turbine may be performed simultaneously with the flowing of EGR from the exhaust to the intake, without using a venturi or other suction device. This is due to the donor cylinder configuration of the engine system, where increased exhaust pressure to drive the EGR is achieved through the position of the EGR bypass valve. Because the position of the EGR bypass valve does not affect the pressure of the exhaust in the exhaust passage upstream of the turbine, the turbine inlet pressure may be lower than the compressor outlet pressure, yet the EGR bypass valve may create enough pressure to allow flow of EGR from the donor cylinders to the intake.

In some examples, method 300 may be performed with systems having various other configurations, such as vehicle system 200 of FIG. 2. Therein, the compressor bleed valve 229 directs compressed air from the compressor outlet to the exhaust downstream of the turbine(s). Accordingly, while opening the compressor bleed valve may prevent surge and lower MAP/cylinder pressure by decreasing the compressor outlet pressure, such an adjustment may not increase boost pressure or compressor efficiency.

An embodiment for a system includes a turbocharger including a turbine positioned in an exhaust passage and a compressor positioned in an intake passage; an engine bypass passage having an inlet fluidically coupled to an outlet of the compressor and an outlet fluidically coupled to an inlet of the turbine; an engine bypass valve to control flow through the engine bypass passage; and a controller configured to adjust a position of the engine bypass valve to maintain compressor operation within a designated compressor efficiency region.

The system may further comprising an engine having a first group of cylinders and a second set of cylinders and an exhaust gas recirculation (EGR) system including an EGR passage coupling the first group of cylinders to the intake passage, an EGR metering valve to control flow of exhaust gas through the EGR passage, and an EGR bypass valve to control flow of exhaust gas from the first group of cylinders to the exhaust passage. The controller may be configured to adjust a position of the EGR metering valve based on a target intake oxygen fraction and adjust a position of the EGR bypass valve to maintain a pressure of exhaust gas in the EGR passage above a pressure of intake air downstream of the compressor. Due to the EGR bypass valve maintaining the EGR passage pressure greater than the intake air pressure, compressed intake air from the compressor outlet may flow to the turbine inlet at the same time EGR from the first group of cylinders flows to the intake system, without using a venturi or other suction device.

The inlet of the turbine may be a single inlet configured to receive exhaust gas from the first group of cylinders, exhaust gas from the second group of cylinders, and intake air from the engine bypass passage. The inlet of the turbine may be a first inlet, and the turbine may include a second inlet configured to receive exhaust gas from the first group of cylinders and exhaust gas from the second group of cylinders.

The system may further include a power turbine positioned in the exhaust passage upstream of the turbine. The controller may be configured to adjust operation of the power turbine to maintain a designated expansion ratio across the power turbine, the designated expansion ratio based on a difference between a pressure of exhaust gas in the EGR passage and a pressure of intake air downstream of the compressor. For example, the operation of the power turbine (e.g., exhaust flow through the power turbine as controlled by a wastegate valve or load on the power turbine) may be adjusted by the controller according to a value in a look-up table indexed to EGR pressure ratio (the pressure in the EGR passage relative to pressure downstream of the compressor).

In an example, the turbocharger is a first turbocharger including a first turbine and a first compressor, and the system further includes a second turbocharger including a second turbine positioned downstream of the first turbine and a second compressor positioned upstream of the first compressor.

In an example, to adjust the position of the engine bypass valve to maintain compressor operation within the designated compressor efficiency region, the controller may be configured to open the engine bypass valve responsive to compressor operation near a surge margin, the engine bypass valve opened by an amount determined to move compressor operation to the designated compressor efficiency region.

In an example, to adjust the position of the engine bypass valve to maintain compressor operation within the designated compressor efficiency region, the controller is configured to open the engine bypass valve responsive to one or more of engine speed below a threshold speed or engine load below a threshold load.

The controller may be configured to open the engine bypass valve responsive to an intake manifold pressure of an intake manifold coupled to the intake passage exceeding a threshold pressure.

An embodiment of a method includes, responsive to compressor operation at a surge margin, opening an engine bypass valve to route intake air from downstream of a compressor to upstream of a turbine to prevent a surge event, the engine bypass valve opened by an amount more than needed to prevent the surge event in order to move compressor operation to a region of greater efficiency; and flowing exhaust gas from a first exhaust manifold of an engine to an intake manifold of the engine. In an example, the region of greater efficiency may be a region of greater efficiency than an efficiency/region of the compressor prior to the engine bypass valve being opened by the amount more than needed to prevent the surge event, and in some examples may be defined as a region on a compressor map. The region of greater of efficiency may be adjacent to a region of lesser efficiency on the compressor map, such that opening of the compressor bypass valve by the amount more than needed pushes compressor operation from the region of lesser efficiency to the region of greater efficiency.

Flowing exhaust gas from the first exhaust manifold to the intake manifold may include flowing a first portion of exhaust gas from the first exhaust manifold to the intake manifold and flowing remaining exhaust gas from the first exhaust manifold to the turbine. The method may further include flowing exhaust gas from a second exhaust manifold of the engine to the turbine. The method may further include flowing the remaining exhaust gas from the first exhaust manifold, the exhaust gas from the second exhaust manifold, and the intake air routed via the engine bypass valve through a single inlet of the turbine. The method may further include opening the engine bypass valve responsive to an intake manifold pressure of the intake manifold exceeding a threshold pressure.

A further embodiment of a system includes an engine having a first group of cylinders and a second group of cylinders, the first group of cylinders coupled to a first exhaust manifold and the second group of cylinders coupled to a second exhaust manifold, both the first group of cylinders and the second group of cylinders coupled to an intake manifold; an exhaust gas recirculation (EGR) system including an EGR passage coupling the first exhaust manifold to the intake manifold, an EGR metering valve to control flow of exhaust gas through the EGR passage, and an EGR bypass valve to control flow of exhaust gas from the first exhaust manifold to the exhaust passage; a turbocharger including a turbine positioned in an exhaust passage and a compressor positioned in an intake passage; an engine bypass passage having an inlet fluidically coupled to an outlet of the compressor and an outlet fluidically coupled to an inlet of the turbine; an engine bypass valve to control flow through the engine bypass passage; and a controller. The controller is configured to, responsive to compressor operation at a surge margin, adjust a position of the engine bypass valve to prevent a surge event, the engine bypass valve selectively adjusted by an amount more than needed to prevent the surge event in order to move compressor operation to a region of greater efficiency; adjust a position of the EGR metering valve based on a target intake oxygen fraction; and adjust a position of the EGR bypass valve to maintain a pressure of exhaust gas in the EGR passage above a pressure of intake air downstream of the compressor.

The controller may be configured to, responsive to adjusting the position of the engine bypass valve, advance fuel injection timing. The controller may be configured to, responsive to adjusting the position of the engine bypass valve, further adjust the position of the EGR metering valve.

In an example, to adjust the position of the engine bypass valve to prevent the surge event, the controller is configured to determine a first engine bypass valve position that prevents the surge event, the compressor configured to operate at a first region of efficiency at the first engine bypass valve position; determine a second engine bypass valve position that moves compressor operation to a second region of efficiency, greater than the first region; adjust the position of the engine bypass valve to the second engine bypass valve position; and if boost pressure drops below a threshold pressure, adjust the position of the engine bypass valve to the first engine bypass valve position.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a turbocharger including a turbine positioned in an exhaust passage and a compressor positioned in an intake passage;
an engine bypass passage having an inlet fluidically coupled to an outlet of the compressor and an outlet fluidically coupled to an inlet of the turbine;
an engine bypass valve to control flow through the engine bypass passage; and
a controller storing non-transitory instructions in memory executable to adjust a position of the engine bypass valve to maintain compressor operation within a designated compressor efficiency region, the designated compressor efficiency region including a region of a compressor map having a higher compressor efficiency than one or more neighboring regions of the compressor map, the compressor map defined by compressor mass flow and compressor pressure ratio.

2. The system of claim 1, further comprising:
an engine having a first group of cylinders and a second group of cylinders; and
an exhaust gas recirculation (EGR) system including an EGR passage coupling the first group of cylinders to the intake passage, an EGR metering valve to control flow of exhaust gas through the EGR passage, and an EGR bypass valve to control flow of exhaust gas from the first group of cylinders to the exhaust passage.

3. The system of claim 2, wherein the instructions are executable to adjust a position of the EGR metering valve based on a target intake oxygen fraction and adjust a position of the EGR bypass valve to maintain a pressure of exhaust gas in the EGR passage above a pressure of intake air downstream of the compressor.

4. The system of claim 2, wherein the inlet of the turbine is a single inlet configured to receive exhaust gas from the first group of cylinders, exhaust gas from the second group of cylinders, and intake air from the engine bypass passage.

5. The system of claim 2, wherein the inlet of the turbine is a first inlet, and wherein the turbine includes a second inlet configured to receive exhaust gas from the first group of cylinders and exhaust gas from the second group of cylinders.

6. The system of claim 2, further comprising a power turbine positioned in the exhaust passage upstream of the turbine.

7. The system of claim 6, wherein the instructions are executable to adjust operation of the power turbine to maintain a designated expansion ratio across the power turbine, the designated expansion ratio based on a difference between a pressure of exhaust gas in the EGR passage and a pressure of intake air downstream of the compressor.

8. The system of claim 2, wherein the turbocharger is a first turbocharger including a first turbine and a first compressor, and further comprising a second turbocharger including a second turbine positioned downstream of the first turbine and a second compressor positioned upstream of the first compressor.

9. The system of claim 1, wherein, to adjust the position of the engine bypass valve to maintain compressor operation within the designated compressor efficiency region, the instructions are executable to open the engine bypass valve responsive to compressor operation within a predefined range of a surge margin of the compressor map, the engine bypass valve opened by an amount that is predicted to move compressor operation to the designated compressor efficiency region.

10. The system of claim 1, wherein, to adjust the position of the engine bypass valve to maintain compressor operation within the designated compressor efficiency region, the instructions are executable to open the engine bypass valve responsive to one or more of engine speed below a threshold speed or engine load below a threshold load.

11. The system of claim 1, wherein the instructions are executable to open the engine bypass valve responsive to an intake manifold pressure of an intake manifold coupled to the intake passage exceeding a threshold pressure, and wherein the designated compressor efficiency region is a region of highest compressor efficiency of the compressor map.

12. A method for controlling operation of a turbocharger compressor, comprising:
via a controller,
determining surge conditions during compressor operation;
responsive to compressor operation at a surge margin, opening an engine bypass valve to route intake air from downstream of the turbocharger compressor to upstream of a turbine to prevent a surge event, the engine bypass valve opened by an amount more than needed to prevent the surge event in order to move compressor operation to a region of greater efficiency, the region of greater efficiency including a region of a compressor map having a higher compressor efficiency than one or more neighboring regions of the compressor map, the compressor map defined by compressor mass flow and compressor pressure ratio; and
flowing exhaust gas from a first exhaust manifold of an engine to an intake manifold of the engine based on adjusting an EGR valve.

13. The method of claim 12, wherein flowing exhaust gas from the first exhaust manifold to the intake manifold comprises flowing a first portion of exhaust gas from the first exhaust manifold to the intake manifold and flowing remaining exhaust gas from the first exhaust manifold to the turbine.

14. The method of claim 13, further comprising flowing exhaust gas from a second exhaust manifold of the engine to the turbine.

15. The method of claim 14, further comprising flowing the remaining exhaust gas from the first exhaust manifold, the exhaust gas from the second exhaust manifold, and the intake air routed via the engine bypass valve through a single inlet of the turbine.

16. The method of claim 12, further comprising opening the engine bypass valve responsive to an intake manifold pressure of the intake manifold exceeding a threshold pressure, and wherein flowing exhaust gas from the first exhaust manifold to the intake manifold includes flowing exhaust gas from the first exhaust manifold to the intake manifold while the engine bypass valve is open and while the intake air from downstream of the compressor is routed to upstream of the turbine.

17. A system, comprising:
an engine having a first group of cylinders and a second group of cylinders, the first group of cylinders coupled to a first exhaust manifold and the second group of cylinders coupled to a second exhaust manifold, both the first group of cylinders and the second group of cylinders coupled to an intake manifold;
an exhaust gas recirculation (EGR) system including an EGR passage coupling the first exhaust manifold to the intake manifold, an EGR metering valve to control flow of exhaust gas through the EGR passage, and an EGR bypass valve to control flow of exhaust gas from the first exhaust manifold to an exhaust passage;
a turbocharger including a turbine positioned in the exhaust passage and a compressor positioned in an intake passage;
an engine bypass passage having an inlet fluidically coupled to an outlet of the compressor and an outlet fluidically coupled to an inlet of the turbine;
an engine bypass valve to control flow through the engine bypass passage; and
a controller storing non-transitory instructions in memory executable to:
responsive to compressor operation at a surge margin, adjust a position of the engine bypass valve to prevent a surge event, the engine bypass valve selectively adjusted by an amount more than needed to prevent the surge event in order to move compressor operation to a region of greater efficiency, the region of greater efficiency including a region of a compressor map having a higher compressor efficiency than one or more neighboring regions of the compressor map, the compressor map defined by compressor mass flow and compressor pressure ratio;
adjust a position of the EGR metering valve based on a target intake oxygen fraction; and
adjust a position of the EGR bypass valve to maintain a pressure of exhaust gas in the EGR passage above a pressure of intake air downstream of the compressor.

18. The system of claim 17, wherein the instructions are executable to, responsive to adjusting the position of the engine bypass valve, advance fuel injection timing.

19. The system of claim 17, wherein the instructions are executable to, responsive to adjusting the position of the engine bypass valve, further adjust the position of the EGR metering valve.

20. The system of claim 17, wherein, to adjust the position of the engine bypass valve to prevent the surge event, the instructions are executable to:

determine a first engine bypass valve position that prevents the surge event, the compressor configured to operate at a first region of efficiency at the first engine bypass valve position;
determine a second engine bypass valve position that moves compressor operation to a second region of efficiency, greater than the first region;
adjust the position of the engine bypass valve to the second engine bypass valve position; and
if boost pressure drops below a threshold pressure, adjust the position of the engine bypass valve to the first engine bypass valve position.

\* \* \* \* \*